UNITED STATES PATENT OFFICE.

THOMAS HENRY COBLEY, OF GLASGOW, NORTH BRITAIN.

IMPROVEMENT IN PROCESSES OF OBTAINING GOLD FROM AURIFEROUS QUARTZ.

Specification forming part of Letters Patent No. 174,118, dated February 29, 1876; application filed October 21, 1875.

*To all whom it may concern:*

Be it known that I, THOMAS HENRY COBLEY, of Glasgow, in the county of Lanark, North Britain, chemist, have invented Improvements in Obtaining Gold from Auriferous Quartz or other analogous silicious materials, of which the following is a specification:

My invention relates to the process of obtaining gold by chlorination and precipitation; and the nature thereof consists in certain modifications of the details thereof, hereinafter described.

The auriferous ore, from which the gold is to be obtained or separated, is roasted in an ordinary kiln until the quartz becomes friable, and previously to roasting steeped in milk of lime. After being roasted the ore is easily crushed to a powder. When being crushed, care must be taken that the ore does not come into contact with metallic iron. It is, therefore, preferable to crush the ore with edge-runners or stamps of granite, porphyry, or similar material. The pulverized ore is placed in a stone tank, vat, or other receptacle. The vessel should not be constructed of wood or metal. To the crushed ore, in this tank or equivalent receptacle, chlorine is added, either in the gaseous or aqueous form, and so soon as the gold is in the state of chloride, and so long as it continues in that state, it is essential that contact between it and other metals, or organic matter, should be carefully avoided. Gaseous chlorine for the purpose of this invention is produced by the reaction between hydrochloric acid and manganese, between manganese, salt, and sulphuric acid, or manganese and dry muriatic acid or chloride of magnesium; but I do not claim these methods of producing gaseous chlorine.

Aqueous chlorine, or chlorine solution, for the purpose of this invention, is produced by dissolving in water hypochlorite of lime, commonly known as bleaching-powder. The vehicle of chlorine, however, which I prefer and employ, is hypochlorite of alumina. This salt may be easily produced by the addition of a solution of alum or sulphate of alumina to hypochlorite of lime. When double decomposition takes place, sulphate of lime is thrown down, and the supernatant liquor is that which is used for dissolving the gold.

In the employment of chlorine for extracting the gold it is preferable to apply heat to the vessels in which the chlorine and pulverized roasted auriferous quartz are contained, and when the chlorine is applied in the shape of hypochlorite of alumina, heat is essential, and the heat requisite may be obtained by introducing a steam jet, or by any other suitable method.

So soon as the chloride of gold is formed from the mixture of chlorine and the powdered auriferous quartz, the chloride, which is soluble, is then carefully washed out with hot water. The washings are filtered through quartz sand with the object of avoiding decomposition by organic matters or metals which are or may be found to exist in ordinary filters. The object of filtering the washed-out chloride of gold is to obtain a clear solution thereof, the filter separating any slime or extraneous matter.

To obtain metallic gold from the solution one of the well-known precipitants is used, such as protosulphate of iron or oxalic acid, but I prefer and employ the use of sulphureted hydrogen, or granulated metallic lead. It will be necessary to keep the precipitate agitated and suspended in the liquid, after which it is filtered through sawdust, which mechanically secretes the gold in its interstices, the sawdust being burnt off so soon as a sufficient quantity of the metal is secreted. The ash thus produced is collected and fused, when a mass of fine gold is obtained.

If granulated metallic lead is used for precipitating the gold, in that case the precipitation must be conducted while the solution is boiling, for otherwise lead chloride would be deposited with the metallic gold.

Sulphureted hydrogen for the purposes of this invention may be produced in several ways, the most convenient and economical of which is to burn iron pyrites and hydrate of lime in a closed crucible or retort, whereby there is formed calcium sulphide, which, on exposure to air and water, become a polysulphide of calcium, or yellow liquor, from which sulphureted hydrogen may be drawn off by heating the liquor.

The acid liquors remaining after the precipitation of gold contain hydrochloric acid, which is very effective in liberating sulphureted hydrogen from the polysulphide of calcium. The addition of organic matter, such as chips, leaves, rushes, or sawdust to the polysulphide of calcium in the boiler, produces a richer flow of sulphureted hydrogen, but the pipe by which the sulphureted hydrogen is conducted from the boiler into the chloride solution must be so arranged—that is to say, provided with a dome, or the equivalent thereof, which will secure that the rush of steam or gas shall not carry any of the liquor or organic matter over into the solution under precipitation.

I am aware that the fact that chlorine gas transforms metallic gold into a soluble chloride, without materially attacking the metallic oxides with which it is associated, has long been known.

I therefore claim—

The process described of obtaining gold from auriferous quartz, by first steeping the ore in the milk of lime; second, roasting it; third, pulverizing it; fourth, subjecting it to the action of heat and chlorine in a stone vat; and, fifth, washing and filtering the chloride of gold, as described, the chloride being then reduced in the ordinary manner.

In witness whereof I have signed my name to this specification in the presence of two subscribing witnesses.

THOMAS HENRY COBLEY. [L. S.]

Witnesses:
 DAVID AUSTIN,
 WILLIAM BALFOUR.